United States Patent
Zeine et al.

(10) Patent No.: US 11,211,830 B2
(45) Date of Patent: Dec. 28, 2021

(54) ANYTIME BEACONING IN A WIRELESS POWER TRANSMISSION SYSTEM

(71) Applicant: Ossia Inc., Bellevue, WA (US)

(72) Inventors: Hatem Ibrahim Zeine, Bellevue, WA (US); Dale Donald Mayes, Bothell, WA (US); Ahmad Moghaddam, Kirkland, WA (US)

(73) Assignee: Ossia Inc., Redmond, WA (US)

( * ) Notice: Subject to any disclaimer, the term of this patent is extended or adjusted under 35 U.S.C. 154(b) by 54 days.

(21) Appl. No.: 15/852,216

(22) Filed: Dec. 22, 2017

(65) Prior Publication Data

US 2019/0140487 A1    May 9, 2019

Related U.S. Application Data

(60) Provisional application No. 62/583,323, filed on Nov. 8, 2017.

(51) Int. Cl.
| | | |
|---|---|---|
| *H02J 50/40* | (2016.01) | |
| *H02J 7/02* | (2016.01) | |
| *H02J 50/20* | (2016.01) | |
| *H02J 50/90* | (2016.01) | |

(52) U.S. Cl.
CPC ............. *H02J 50/40* (2016.02); *H02J 7/025* (2013.01); *H02J 50/20* (2016.02); *H02J 50/90* (2016.02)

(58) Field of Classification Search
CPC .............. H02J 50/00; H02J 50/40; H04B 5/00
USPC ......................................................... 307/104
See application file for complete search history.

(56) References Cited

U.S. PATENT DOCUMENTS

| | | | |
|---|---|---|---|
| 10,211,685 B2 * | 2/2019 | Bell | H02J 50/80 |
| 2010/0259447 A1 * | 10/2010 | Crouch | H01Q 21/28 342/374 |
| 2010/0315045 A1 * | 12/2010 | Zeine | H02J 50/90 320/137 |
| 2012/0274154 A1 | 11/2012 | DeLuca | |
| 2012/0326660 A1 * | 12/2012 | Lu | H01Q 21/061 320/108 |
| 2014/0094116 A1 * | 4/2014 | Walley | H02J 50/12 455/41.1 |
| 2014/0217967 A1 * | 8/2014 | Zeine | H02J 7/025 320/166 |
| 2016/0156388 A1 | 6/2016 | Zeine et al. | |
| 2016/0299210 A1 * | 10/2016 | Zeine | H02J 7/025 |
| 2016/0301238 A1 | 10/2016 | Khoshvenis | |
| 2016/0301259 A1 * | 10/2016 | Zeine | H02J 50/40 |
| 2016/0356860 A1 * | 12/2016 | Zeine | H02J 50/80 |
| 2017/0111243 A1 * | 4/2017 | Bell | H04L 43/022 |
| 2017/0141621 A1 * | 5/2017 | Zeine | H02J 50/40 |

(Continued)

OTHER PUBLICATIONS

International Application No. PCT/US2017/068128, International Search & Written Opinion, 13 pages, dated Jul. 24, 2018.

*Primary Examiner* — Adi Amrany

(57) ABSTRACT

Systems and methods are described for operating a wireless power transmission system. The wireless power transmission system receives an encoded beacon signal delivered from and initiated by a wireless power receiver client configured to receive wireless power from the wireless power transmission system. The wireless power transmission system also delivers wireless power to the wireless power receiver client and simultaneously detects for additional encoded beacon signals delivered from and initiated by additional wireless power receiver clients.

21 Claims, 10 Drawing Sheets

(56) References Cited

U.S. PATENT DOCUMENTS

2017/0229925 A1    8/2017   Shirani-Mehr et al.
2017/0302109 A1   10/2017   Lee et al.
2019/0252925 A1*   8/2019   Zeine .................... H01L 27/124

* cited by examiner

ANYTIME BEACONING IN A WIRELESS POWER TRANSMISSION SYSTEM

CROSS-REFERENCE TO RELATED APPLICATIONS

This application claims priority to and benefit from U.S. Provisional Patent Application No. 62/583,323 titled "Anytime Beaconing in a Wireless Power Transmission System" filed on Nov. 8, 2017; which is expressly incorporated by reference herein.

BACKGROUND

Many electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It would, therefore, be desirable to deliver power for electronics wirelessly.

In the field of wireless charging, safe and reliable use within a business or home environment is a primary concern. To date, wireless charging has been limited to magnetic or inductive charging based solutions. Unfortunately, these solutions require a wireless power transmission system and a receiver to be in contact or in very close proximity to one another. Wireless power transmission without contact or very close proximity requires more advanced mechanisms, such as, for example, transmission via radio frequency (RF) signals, ultrasonic transmissions, laser powering, to name a few, each of which presents a number of unique hurdles to commercial success.

The most viable systems to date utilize power transmission via RF. However, in the context of RF transmission within a common residence, commercial building, or other habited environment, there are many reasons to limit the RF exposure levels of the transmitted signals. Consequently, power delivery is constrained to relatively low power levels. Due to this low energy transfer rate, it is imperative that the system is efficient.

Typical techniques for providing signal to a client include a master bus controller directing clients when to beacon and directing the antenna elements when to take a sample of incoming beacons and determine the complex phase. The master bus controller then tells the antenna elements to compute the complex conjugate and store the result as a path back to the client for providing power signals to the clients. The master bus controller then directs the next time slot to the next client. While this system may enable the clients to receive the power signals at a specified time slot, this technique requires a large volume of communications between the master bus controller, the antenna boards, and the clients as timing of client communications must be individually coordinated by the master bus controller. Therefore, this technique decreases available time slots that may be used for additional power.

Other typical techniques may include the master bus controller pre-calculating a client power schedule for the subsequent time interval and sending the schedule to both the clients and antenna boards. In this method, the master bus controller allocates a start time and the prearranged beaconing schedule to determine which clients receive power signals and at which time slot. While this method is more time efficient than previous power beaconing models, time slots that may have been used for sending power signals are allocated to sending communications including the prearranged schedules. Additionally, this technique does not allow clients to have any control over which transmission system the client may receive power from and therefore, clients are unable to move or roam while listening for beacons or receiving power beacons. Essentially, the clients become active power receivers since they need to be aware of when the communication beacons are transmitted to be able to then harvest the power that was available based on the time schedule.

Accordingly, a need exists for technology that overcomes the demonstrated problems outlined above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

SUMMARY

Figure 1:
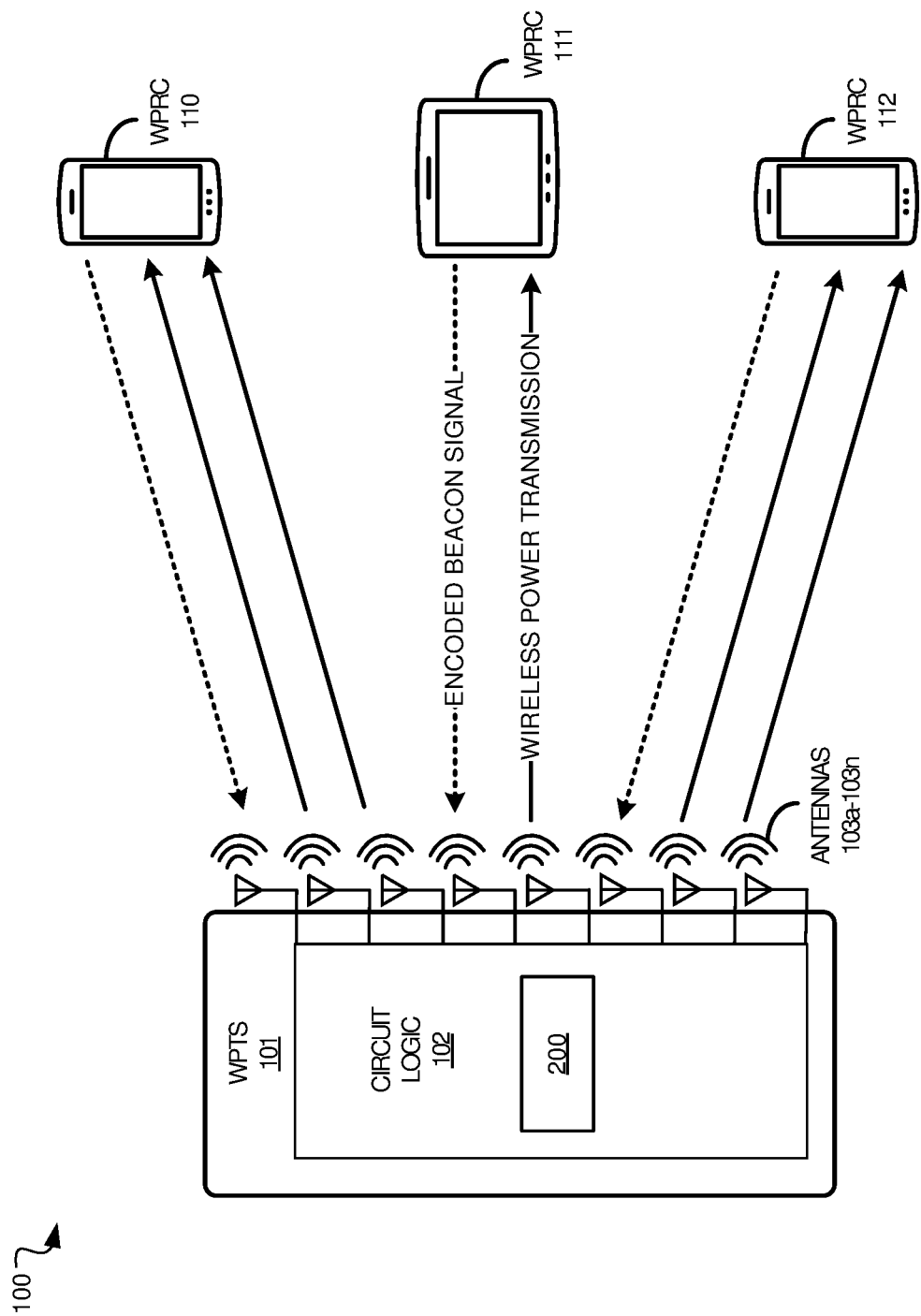
FIG. 1 depicts an example wireless power delivery environment illustrating anytime beaconing for one or more wireless power transmission systems to deliver wireless power to various wireless devices within the wireless power delivery environment using full-duplexing in accordance with some embodiments.

In one embodiment, a method for wireless power transmission using full-duplexing is described. The method includes receiving an encoded beacon signal delivered from and initiated by a wireless power receiver client configured to receive wireless power from the wireless power transmission system. The method further includes delivering wireless power to the wireless power receiver client and simultaneously detecting for additional encoded beacon signals delivered from and initiated by additional wireless power receiver clients.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

DETAILED DESCRIPTION

Techniques are described herein for full-duplex power transmission in wireless transmission environment applications. More specifically, embodiments of the present disclosure describe techniques for receiving one or more encoded signals from a wireless transmission power receiver client while simultaneously delivering wireless power to other wireless power receiver clients.

A structure that facilitates wireless power transmission is described herein. More specifically, a wireless power transmission system using full-duplexing is disclosed for delivering wireless power to a first wireless power receiver client while simultaneously monitoring for and/or receiving beacons from other wireless power receiver clients. The wireless power transmission system may include multiple antenna arrays for receiving beacons from a wireless power receiver client and transmitting power back to the wireless power receiver client. The allocation of antenna arrays transmitting power and wireless power clients receiving power may be determined based on initiation by the wireless power receiver clients instead of a time schedule determined by the wireless power transmission system. Therefore, the wireless power receiver client may be able to stay in a passive power harvesting mode and wakeup when wireless power is needed and without having to listen for a beacon schedule from the wireless power transmission system to initiate power transmission. Further, in such systems, full-duplexing of the wireless power transmission system is necessary for simultaneously receiving encoded beacon signals from and transmitting wireless power to the wireless power receiver client to ensure effective and efficient service.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

FIG. 1 depicts a block diagram including an example wireless power transmission environment 100 illustrating wireless power delivery from one or more wireless power transmission system, such as wireless power transmission system 101, using full-duplexing for anytime beaconing. More specifically, FIG. 1 illustrates power transmission to one or more wireless power receiver clients 110-112 (also referred to as "wireless power delivery systems", "antenna array systems" and "wireless chargers"). Wireless power transmission system 101 is configured to receive encoded beacons from and transmit wireless power to wireless power receiver clients 110-112 (also referred to herein as "clients" and "wireless power receivers"). Wireless power receiver clients 110-112 are configured to receive and process wireless power from one or more wireless power transmission systems, such as wireless power transmission system 101. Components of an example wireless power transmission system 101 are shown and discussed in greater detail below, as well as in FIG. 4. Components of an example wireless power receiver clients 110-112 are shown and discussed in greater detail with reference to FIG. 5.

Wireless power transmission system 101 can include multiple antennas 103a-103n, e.g., an antenna array including hundreds or thousands of antennas, which are capable of delivering wireless power to wireless power receiver clients 110-112. In some embodiments, the antennas are adaptively-phased radio frequency (RF) antennas. The wireless power transmission system 101 is capable of determining the appropriate phases with which to deliver a coherent power transmission signal to wireless power receiver clients 110-112. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital logic and modems. In some embodiments, the wireless power transmission system 101 can have an embedded Wi-Fi hub for data communications via one or more antennas or transceivers.

As illustrated in the example of FIG. 1, power delivery antennas 103a-103n are included in wireless power transmission system 101. The power delivery antennas 103a-103n are configured to provide delivery of wireless radio frequency power in the wireless power delivery environment. In some embodiments, one or more of the power delivery antennas 103a-103n can alternatively or additionally be configured for data communications in addition to or in lieu of wireless power delivery. The one or more data communication antennas are configured to send data communications to and receive data communications from wireless power receiver clients 110-112. In some embodiments, the data communication antennas can communicate via Bluetooth™, Wi-Fi™, ZigBee™, etc. Other data communication protocols are also possible. In some embodiments, one or more of the power delivery antennas 103a-103n can alternatively or additionally be configured for data communications in addition to or in lieu of wireless power delivery. The one or more data communication antennas are configured to send data communications to and receive data communications from wireless power receiver clients 110-112.

Each of wireless power receiver clients 110-112 includes one or more antennas (not shown) for transmitting signals to and receiving signals from wireless power transmission system 101. Likewise, wireless power transmission system 101 includes an antenna array having one or more antennas and/or sets of antennas capable of emitting continuous wave or discrete (pulse) signals at specific phases relative to each other. As discussed above, wireless power transmission system 101 is capable of determining the appropriate phases for delivering the coherent signals to the power delivery antennas 103a-103n. For example, in some embodiments, coherent signals can be determined by computing the complex conjugate of a received beacon (or calibration) signal at each antenna of the array such that the coherent signal is phased for delivering power to the particular power receiver client that transmitted the beacon (or calibration) signal. The wave can be configured to emit a signal (e.g., continuous wave or pulsed transmission signal) from multiple antennas using multiple waveguides at a specific phase relative to each other. Other techniques for delivering a coherent wireless power signal are also applicable such as, for example, the techniques discussed in U.S. patent application Ser. No. 15/852,348 titled "Transmission Path Identification based on Propagation Channel Diversity" filed on the same day as this application; which is expressly incorporated by reference herein.

Although not illustrated, each component of the environment, e.g., wireless power receiver clients 110-112, wireless power transmission system 101, can include control and synchronization mechanisms, e.g., a data communication synchronization module. Wireless power transmission system 101 can be connected to a power source such as, for example, a power outlet or source connecting the wireless power transmission systems to a standard or primary alternating current (AC) power supply in a building. Alternatively, or additionally, wireless power transmission system 101 can be powered by a battery or via other mechanisms, e.g., solar cells, etc.

As shown in the example of FIG. 1, wireless power receiver clients 110-112 include mobile phone devices and a wireless tablet. However, wireless power receiver clients 110-112 can be any device or system that needs power and is capable of receiving wireless power via one or more integrated power receiver clients. As discussed herein, the one or more integrated power receiver clients receive and process power from one or more wireless power transmission systems and provide the power to the wireless power receiver clients 110-112 (or internal batteries of the wireless devices) for operation thereof.

As described herein, each of wireless power receiver clients 110-112 can be any system and/or device, and/or any combination of devices/systems that can establish a connection with another device, a server and/or other systems within the example environment 100. In some embodiments, the wireless power receiver clients 110-112 each include displays or other output functionalities to present data to a user and/or input functionalities to receive data from the user. By way of example, wireless power receiver client 110 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, wireless power receiver client 110 can also be any wearable device such as watches, necklaces, rings or even devices embedded on or within the customer. Other examples of wireless power receiver client 110 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the power receiver clients 110-112 can each include a data communication module for communication via a data channel. Alternatively, or additionally, the power receiver clients 110-112 can direct antennas to communicate with wireless power transmission system 101 via existing data communications modules. In some embodiments the beacon signal, which is primarily referred to herein as a continuous waveform, can alternatively or additionally take the form of a modulated signal.

Wireless power transmission system also includes control circuit 102. Control circuit 102 is configured to provide control and intelligence to the wireless power transmission system components. Control circuit 102 may comprise one or more processors, memory units, etc., and direct and control the various data and power communications. Control circuit 102 can direct data communications on a data carrier frequency. Likewise, control circuit 102 can direct wireless transmission system 100 to communicate with receiving devices as discussed herein. The data communications can be, by way of example and not limitation, Bluetooth™, Wi-Fi™, ZigBee™, etc. Other communication protocols are possible.

It is appreciated that the use of the term "wireless power transmission system" does not necessarily limit the wireless power transmission system to any specific structure. That is, the wireless power transmission system does not need to be structured in a specific form or geometry. Furthermore, as used herein the term "transmission system" or "wireless power transmission system" may be used to include related and peripheral circuitry for signal generation, reception and transmission, such as radios, digital logic and modems.

Figure 2:
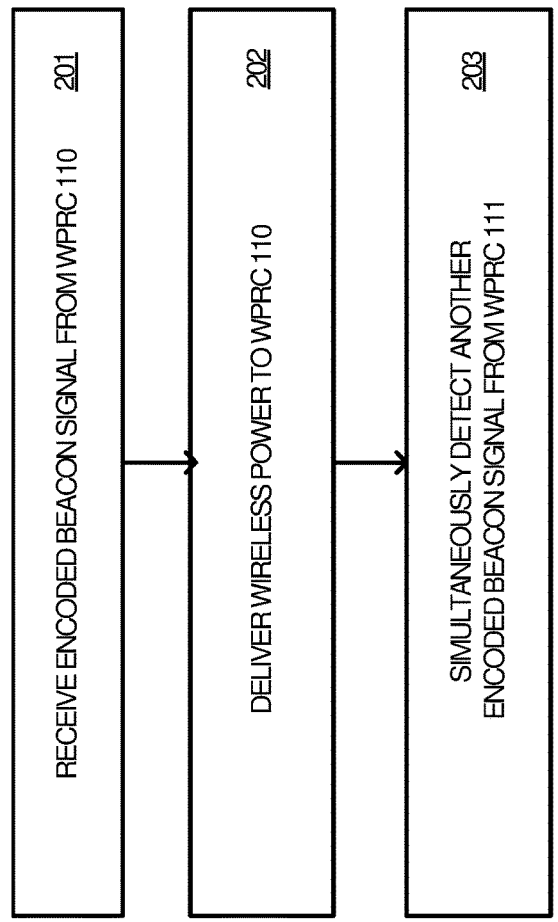
FIG. 2 depicts a flow diagram illustrating an example operation for anytime beaconing performed by a wireless power transmission system to wirelessly transmit power to one or more wireless receiver clients in accordance with some embodiments.

FIG. 2 is a flow diagram illustrating example operation 200 for wireless power delivery from one or more wireless power transmission system, such as wireless power transmission system 101, using full-duplexing for anytime beaconing in accordance with an embodiment. As discussed, in some embodiments, wireless power transmission system 101 may be used for wireless communication transmission waves, wireless power transmission waves, or dual-purpose data/power transmission waves. In an initial step, wireless power transmission system 101 receives (201) an encoded beacon signal delivered from and initiated by wireless power receiver client 110 configured to receive wireless power from the wireless power transmission system 101.

In some embodiments, wireless power receiver client 110 initiates the encoded beacon signal when wireless power receiver client 110 determines a low power level of wireless power receiver client 110. In this example embodiment, wireless power receiver client 110 may remain in sleep mode until it determines that the power level is below a threshold value. Wireless power receiver client 110 may then wakeup and initiate the wireless power transmission by transmitting the encoded beacon signal to wireless power transmission system 101.

In other embodiments, wireless power receiver client 110 may initiate the encoded beacon signal when wireless power receiver client 110 determines a movement of wireless power receiver client 110 into a receiving range of wireless power transmission system 101. Wireless power receiver client 110 may include a motion detector to detect when the user of the power receiving device is roaming. Wireless power receiver client 110 may also determine to initiate the wireless power transmission by determining that the signal strength of wireless power transmission system is above a signal strength range and therefore, that the user has roamed into the wireless power charging range of wireless power transmission system 101.

In some embodiments, the wireless power receiver client 110 may initiate the encoded beacon signal on a time-based schedule or some other trigger-based event, e.g., motion detection, temperature threshold, button press on the device, etc.

In a next operation, wireless power transmission system 101 delivers wireless power to wireless power receiver client 110 (step 202). Wireless power transmission system 101 simultaneously detects for additional encoded beacon signals delivered from and initiated by wireless power receiver client 111 (step 203).

In some embodiments, wireless power transmission system 101 processes the encoded beacon signal received from the wireless power receiver client to identify client-specific information associated with the wireless power receiver client. In this manner, beacon signals from wireless power receiver clients 110-112 can be identified. In yet other embodiments, wireless power transmission system 101 processes the encoded beacon received from wireless power receiver client 110 to identify client-specific information associated with wireless power receiver client 110 by processing a received phase of the encoded beacon received from wireless power receiver client 110 and identifying the client-specific information associated with wireless power receiver client 110 based on a stored phase corresponding to the received phase on the encoded beacon.

Client-specific information can include various properties and/or requirements corresponding to wireless power receiver client 110. For example, the client-specific information can include, but is not limited to, battery level of wireless power receiver client 110, battery level of first wireless power receiver client 110, battery usage information, temperature information, distance to wireless power transmission system 101, additional wireless power transmission systems currently providing power to wireless power receiver client 110, etc.

The beacon signals can be encoded or modulated with a transmission configuration that is provided to selected clients in the wireless power delivery environment. The transmission configuration may be coherent signals determined by computing the complex conjugate of a received beacon (or calibration) signal at each antenna of the array such that the coherent signal is phased for delivering power. In some embodiments, a different transmission configuration is provided to each client or communication path. Different transmission configurations for each of wireless power receiver clients 110-112 can facilitate simultaneous or near simultaneous transmission of beacon signaling by the clients in the wireless power delivery environment further ensuring that only authorized (selected) clients are "locked" by the wireless power delivery system.

In some implementations, wireless power transmission system 101 may also generate a transmission configuration for the wireless power receiver client based on the client-specific information. Wireless power transmission system 101 directs an antenna array to deliver wireless power to wireless power receiver client 110 using the generated transmission configuration. Wireless power transmission system 101 simultaneously receives another encoded beacon signal delivered from and initiated by wireless power receiver client 111 of the additional wireless power receiver clients.

In some embodiments, wireless power transmission system 101 generates a transmission configuration for first wireless power receiver client 110 based on the encoded beacon signal by determining a complex conjugate of the beacon signal at each antenna of an antenna array and calculating the first power transmission phase-shift based on the complex conjugate of the beacon signal at each antenna of the antenna array. In this example embodiment, wireless power transmission system 101 directs the antenna array to deliver wireless power to first wireless power receiver client 110 using the generated transmission configuration by directing the antenna array to deliver wireless power to wireless power receiver client 110 using the calculated power transmission phase-shift.

In still another embodiment, wireless power transmission system 101 delivers the wireless power to wireless power receiver client 110 on a first frequency channel or subchannel and another encoded beacon signal is simultaneously received from wireless power receiver client 111 on a second frequency channel or subchannel. In other example embodiments, wireless power receiver client 110 is configured to simultaneously receive wireless power from multiple wireless power transmission systems. Wireless power receiver clients 110-112 may each be configured to use half-duplexing.

Other embodiments may include signal and echo cancellation techniques which contribute toward reducing the interaction between the receiver on wireless power transmission system 101 receiving the encoded beacon signals and the transmitter on wireless power transmission system 101 transmitting the wireless power. For example, wireless transmission system 101 may require 100-125 decibels (dB) of echo cancellation from the incoming beacon signal. Some example rejection techniques allow for cancelling out and filtering the received and transmitted signals using calibration to tune the phase and amplitude of the cancellation path to match the transmission leakage at the center frequency. One proposed method to broaden the cancellation bandwidth is to use the time domain of an inverse Fourier transform to reveal main leakage paths originating from finite isolation through the antennas and signal reflection from the antennas. This method then utilizes adaptive filters to create an inverse time-domain response of the leakage path to track a time-varying response. Cancellation may further be improved by using tap adaptive filters, analog radio frequency cancellers, attenuation capacitors, and by attaching cancellers to differential low-impedance sides of an output-matching network. Out of band filtering can also be utilized to obtain 100+dB isolation between incoming and outgoing RF if the system detects a slight difference between the transmitted power and incoming power to maintain a good isolation margin and acceptable phase relevance.

Figure 3:
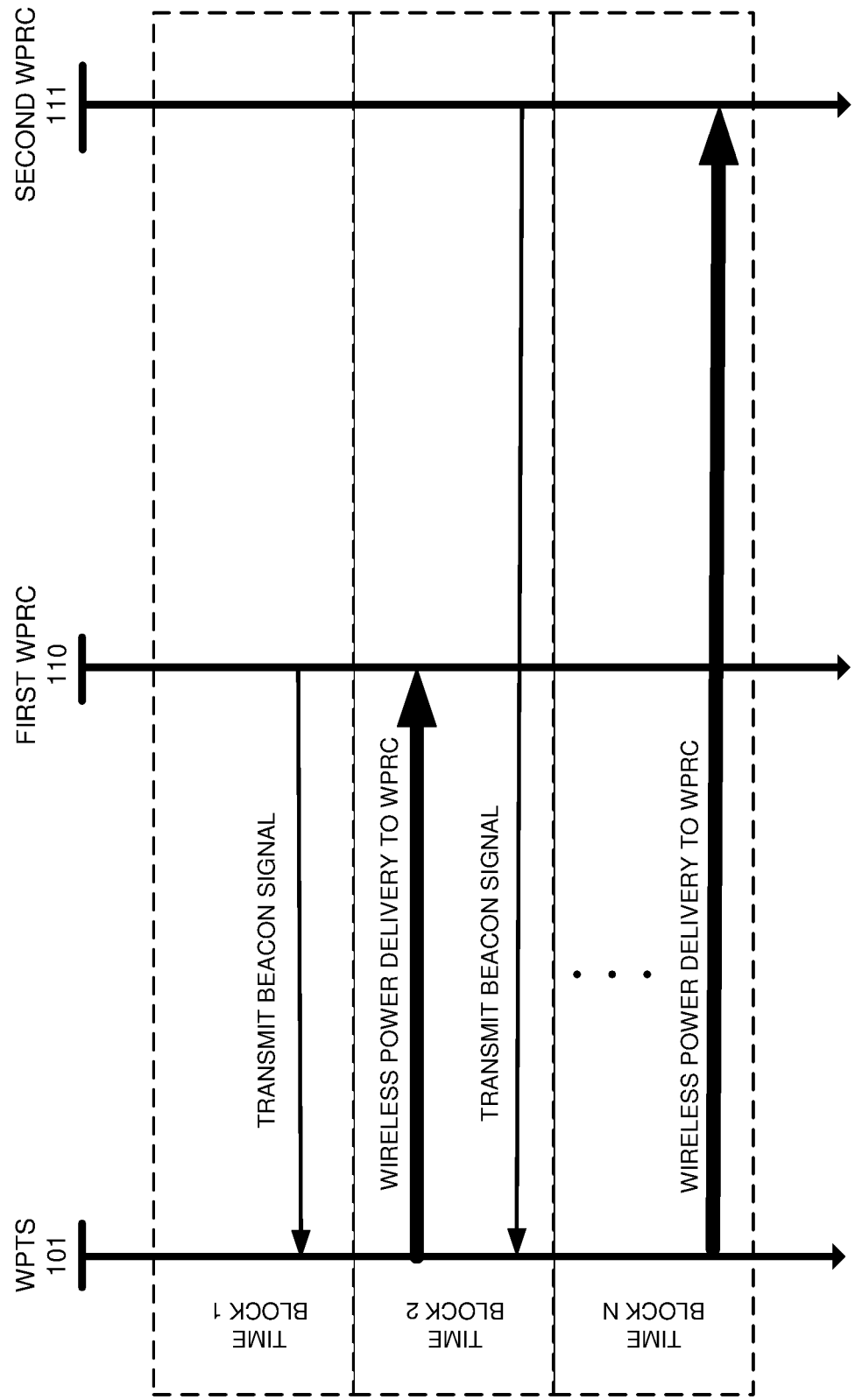
FIG. 3 depicts a sequence diagram for anytime beaconing between a wireless power transmission system and a wireless receiver client for wireless power delivery in accordance with some embodiments.

FIG. 3 is a sequence diagram illustrating example operations of illustrating wireless power delivery from one or more wireless power transmission system, such as wireless power transmission system 101, using full-duplexing for anytime beaconing in accordance with an embodiment. As shown in FIG. 3, various steps are performed during a corresponding time block. It should be noted that although the time blocks are sequential and consecutive in this example embodiment, in other embodiments the time blocks may vary in order or space between reception of one encoded beacon signal and transmission of the power signal. However, in either scenario, wireless power transmission system 101 may receive encoded beacon signals and transmit power signals anytime and to multiple wireless power receiver clients.

Initially, at time block one, wireless power transmission system 101 receives an encoded beacon signal from first wireless power receiver client 110. For example, first wireless power receiver client 110 may initially be in sleep mode and not listening to wireless power transmission system 101. First wireless power receiver 110 may then determine that the battery power level is low and wakeup. First wireless power receiver 110 may then initiate the wireless power transmission in response to determining that the battery power is below a threshold level. Although not shown, wireless power transmission system 101 then processes the encoded beacon signal received from first wireless power receiver client 110 to identify client-specific information associated with wireless power receiver client 110. Wireless power transmission system 101 may also generate a transmission configuration for first wireless power receiver client 110 based on the client-specific information.

Moving to the second time block on the sequence diagram, wireless power transmission system 101 delivers wireless power to first wireless power receiver client 110 during a second time block using the generated transmission configuration. Also during the second time block, wireless power transmission system 101 simultaneously receives another encoded beacon signal delivered from and initiated by second wireless power receiver client 111 of the plurality of wireless power receiver clients. Like first wireless power receiver client 110, second wireless power receiver client 111 may initiate the encoded beacon signal in response to determining that its power level is below a threshold power level.

At this point in the sequence, wireless power transmission system 101 processes the new encoded beacon signal received from second wireless power receiver client 111 to identify client-specific information associated with second wireless power receiver client 111. Wireless power transmission system 101 may also generate a transmission configuration for second wireless power receiver client 111 based on the client-specific information. The process then continues to a subsequent time block in which wireless power transmission system 101 delivers wireless power to second wireless power receiver client 111 during a subsequent time block using the generated transmission configuration. Also during the subsequent time block, wireless power transmission system 101 simultaneously receives additional encoded beacon signals delivered from and initiated by additional wireless power receiver clients of the plurality of wireless power receiver clients.

Figure 4:
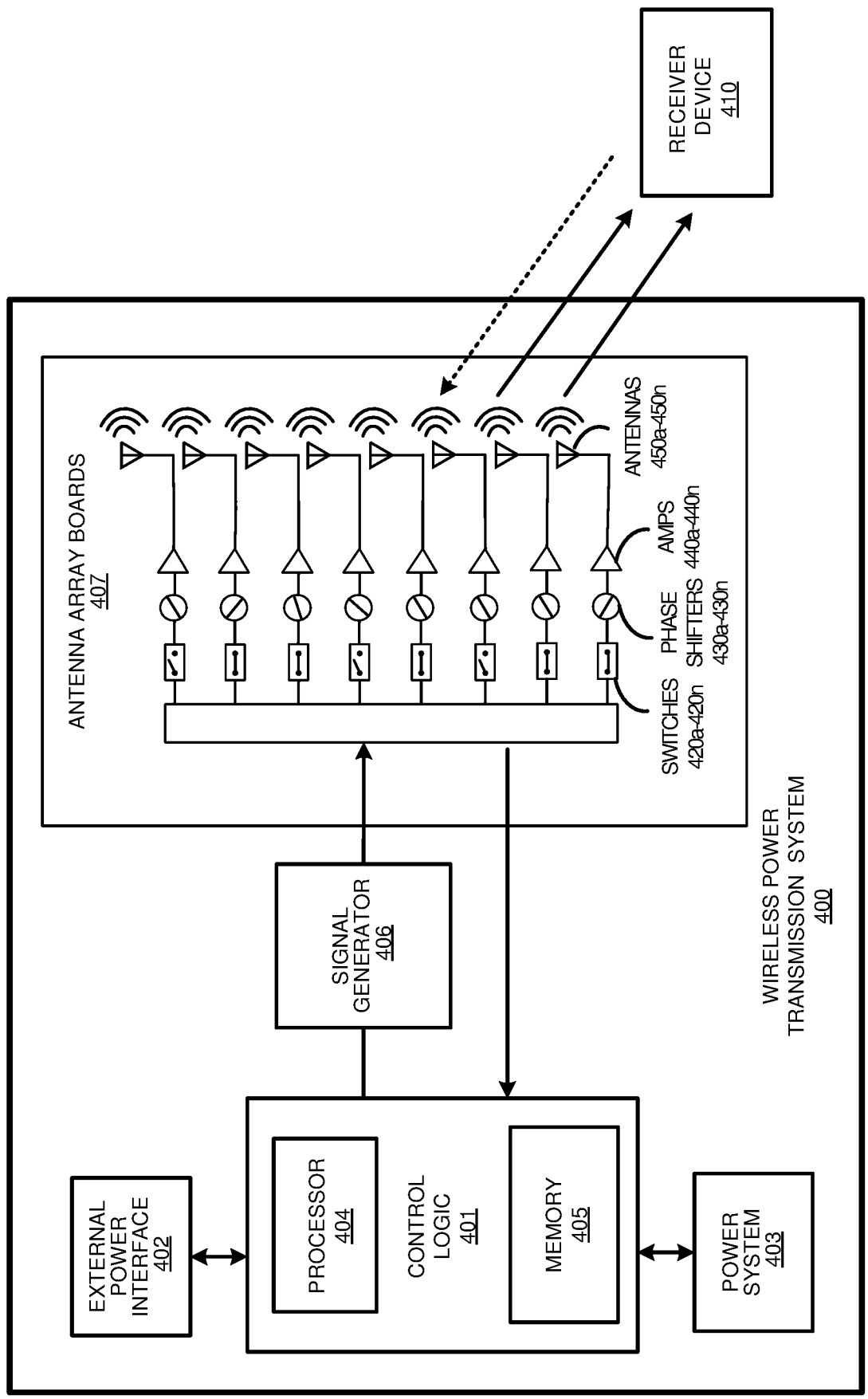
FIG. 4 depicts a block diagram illustrating example components of a wireless power transmission system for anytime beaconing in accordance with some embodiments

FIG. 4 depicts a block diagram illustrating example components of a wireless power transmission system 400 for anytime beaconing in accordance with some embodiments. As illustrated in the example of FIG. 4, the wireless power transmission system 400 includes a control logic 401, external power interface 402, and power system 403. Control logic 401 includes processor 404 and memory 405. Additionally, wireless power transmission system 400 includes signal generator 406 transmitting waves to antenna array boards 407. Each antenna array board 407 includes switches 420a-420n, phase shifters 430a-430n, power amplifiers 440a-440n, and antenna arrays 450a-450n.

Control logic 401 is configured to provide control and intelligence to the array components. Control logic 401 may direct and control the various data and power communications. Signal generator 406 can compute a signal wave comprising power or data communications on a data carrier frequency. The signal wave can be Bluetooth™, Wi-Fi™, ZigBee™, etc., including combinations or variations thereof. In some embodiments, logic 401 can also determine a transmission configuration comprising a phase-shift based the encoded beacon signal received from receiver device 410.

The external power interface 402 is configured to receive external power and provide the power to various components. In some embodiments, the external power interface 402 may be configured to receive a standard external 24 Volt power supply. In other embodiments, the external power interface 402 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

Switches 420a-420n may be activated to transmit power and receive encoded beacon signals when the switches are closed, as can be seen by the connected lines inside each of switches 420a-420n. On the other hand, switches 420a-420n may be deactivated for power transmission and encoded beacon reception when the switches are open, as can be seen by the disconnected lines inside each of switches 420a-420n. Additional components are also possible. For example, in some embodiments phase-shifters 430a-430n are included to change the phase of the frequency when transmitting power to receiver device 410. Phase shifter 430a-430n may transmit the power signal to receiver device 410 based on a complex conjugate of the phase included in the encoded beaconing signal from receiver device 410. The phase-shift may also be determined by processing the encoded beaconing signal received from receiver device 410 and identifying receiver device 410. Wireless power transmission system 400 may then determine a phase-shift associated with receiver device 410 to transmit the power signal.

In operation, control logic 401, which controls the wireless power transmission system 400, receives power from a power source over external power interface 402 and is activated. Control logic 401 may identify available wireless receiver client 410 within range of the wireless power transmission system by receiving an encoded beacon signal initiated by the wireless receiver client 410 at antennas 450a-450n. When the wireless receiver client 410 is identified based on the encoded beaconing signal, a set of antenna elements on the wireless power transmission system power on, enumerate, and (optionally) calibrate for wireless power transmission. At this point, control logic 401 may also be able to simultaneously receive additional encoded beaconing signals from other wireless receiver clients at antennas 450a-450n.

Once the transmission configuration has been generated and instructions have been received from control logic 401, signal generator 406 generates and transfers the power waves to antenna boards 407. Based on the instruction and generated signals, power switches 420a-420n are opened or closed and phase shifters 430a-430n are set to the phase associated with the transmission configuration. The power signal is then amplified by power amplifiers 440a-440n and transmitted at an angle directed toward receiver device 410. As discussed herein, a set of antennas 450a-450n are simultaneously receiving encoded beacon signals from additional receiver clients.

Figure 5:
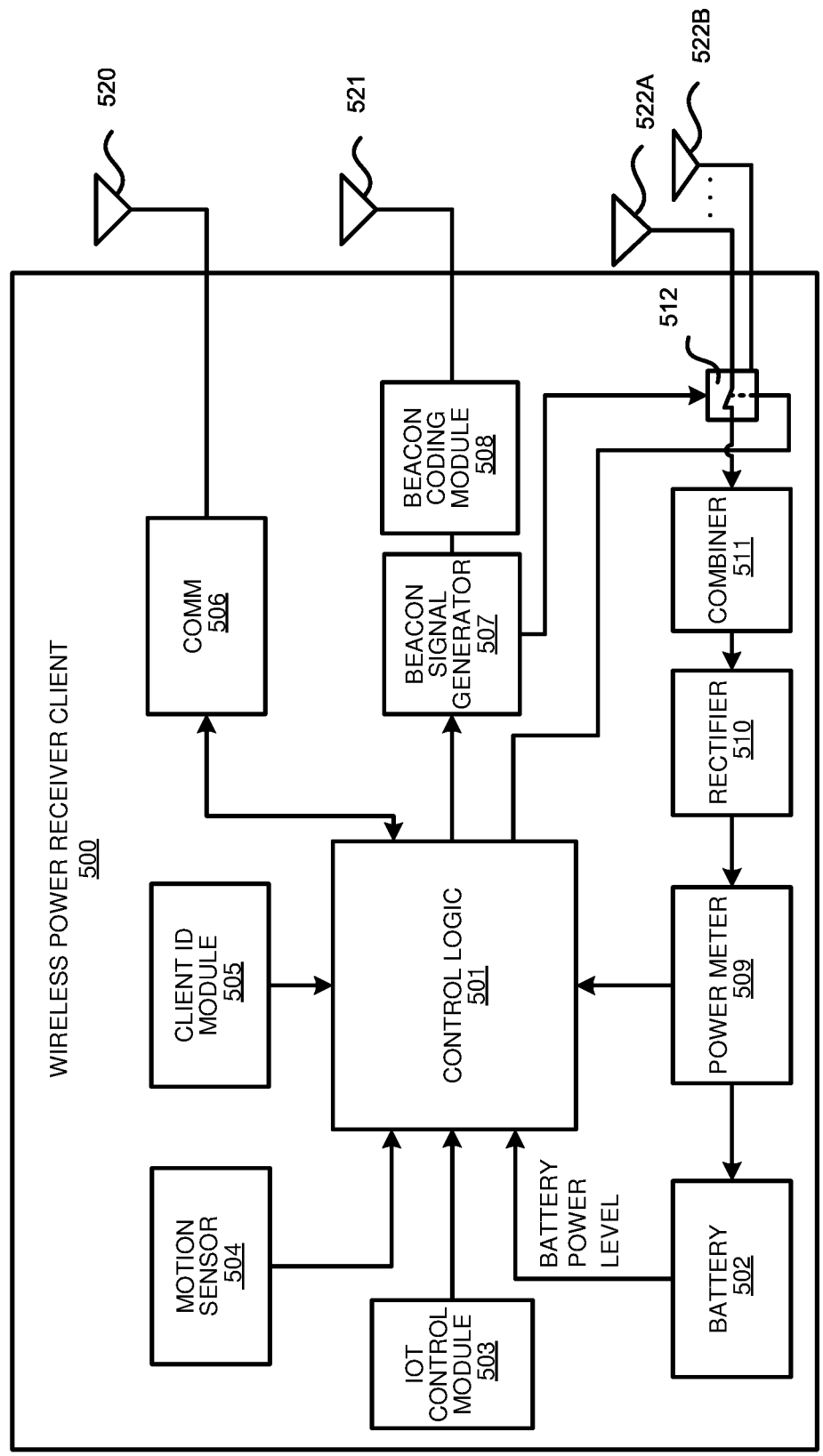
FIG. 5 depicts a block diagram illustrating example wireless power receiver client in accordance with some embodiments.

FIG. 5 depicts a block diagram illustrating example wireless power receiver client in accordance with some embodiments. As illustrated in the example of FIG. 5, wireless power receiver client 500 includes control logic 501, battery 502, an IoT control module 503, communication block 506 and associated antenna 520, power meter 509, rectifier 510, a combiner 511, beacon signal generator 507, beacon coding unit 508 and an associated antenna 521, and switch 512 connecting the rectifier 510 or the beacon signal generator 507 to one or more associated antennas 522a-522n. Some or all of the components can be omitted in some embodiments. It should be noted that although the wireless power transmission system 400 may use full-duplexing, wireless power receiver client 500 may use half-duplexing.

A combiner 511 receives and combines the received power transmission signals from the power transmitter of the wireless power receiver client 500. The combiner can be any combiner or divider circuit that is configured to achieve isolation between the output ports while maintaining a matched condition. For example, the combiner 511 can be a Wilkinson Power Divider circuit. The rectifier 510 receives the combined power transmission signal from the combiner 511, if present, which is fed through the power meter 509 to the battery 502 for charging. In other embodiments, each antenna's power path can have its own rectifier 510 and the DC power out of the rectifiers is combined prior to feeding the power meter 509. The power meter 509 can measure the received power signal strength and provides the control logic 501 with this measurement.

Battery 502 can include protection circuitry and/or monitoring functions. Additionally, the battery 502 can include one or more features, including, but not limited to, current limiting, temperature protection, over/under voltage alerts and protection, and coulomb monitoring. The control logic 501 can receive the battery power level from the battery 502 itself. The control logic 501 may also transmit/receive via the communication block 506 a data signal on a data carrier frequency, such as the base signal clock for clock synchronization. The beacon signal generator 507 generates the beacon signal, or calibration signal, transmits the beacon signal using antenna 521 after the beacon signal is encoded.

It may be noted that, although the battery 502 is shown as charged by, and providing power to, wireless power receiver client 500, the receiver may also receive its power directly from the rectifier 510. This may be in addition to the rectifier 510 providing charging current to the battery 502, or in lieu of providing charging. Also, it may be noted that the use of multiple antennas is one example of implementation and the structure may be reduced to one shared antenna.

In some embodiments, the control logic 501 and/or the IoT control module 503 can communicate with and/or otherwise derive IoT information from wireless power receiver client 500. The IoT information can include, but is not limited to, information about the capabilities of the wireless power receiver client 500, usage information of the wireless power receiver client 500, power levels of the battery or batteries of the wireless power receiver client 500, and/or information obtained or inferred by the wireless power receiver client 500. In some embodiments, a client identifier (ID) module 505 stores a client ID that can uniquely identify the power receiver client in a wireless power delivery environment. For example, the ID can be transmitted to one or more wireless power transmission systems in the encoded beacon signal. In some embodiments, power receiver clients may also be able to receive and identify other power receiver clients in a wireless power delivery environment based on the client ID.

An optional motion sensor 504 can detect motion and signal the control logic 501 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to initiate wireless power transmission from the wireless power transmission system using the encoded beacon. In some embodiments, when a device is used in a moving environment like a car, train or plane, the power might only be transmitted intermittently or at a reduced level unless the device is critically low on power.

Figure 6A:
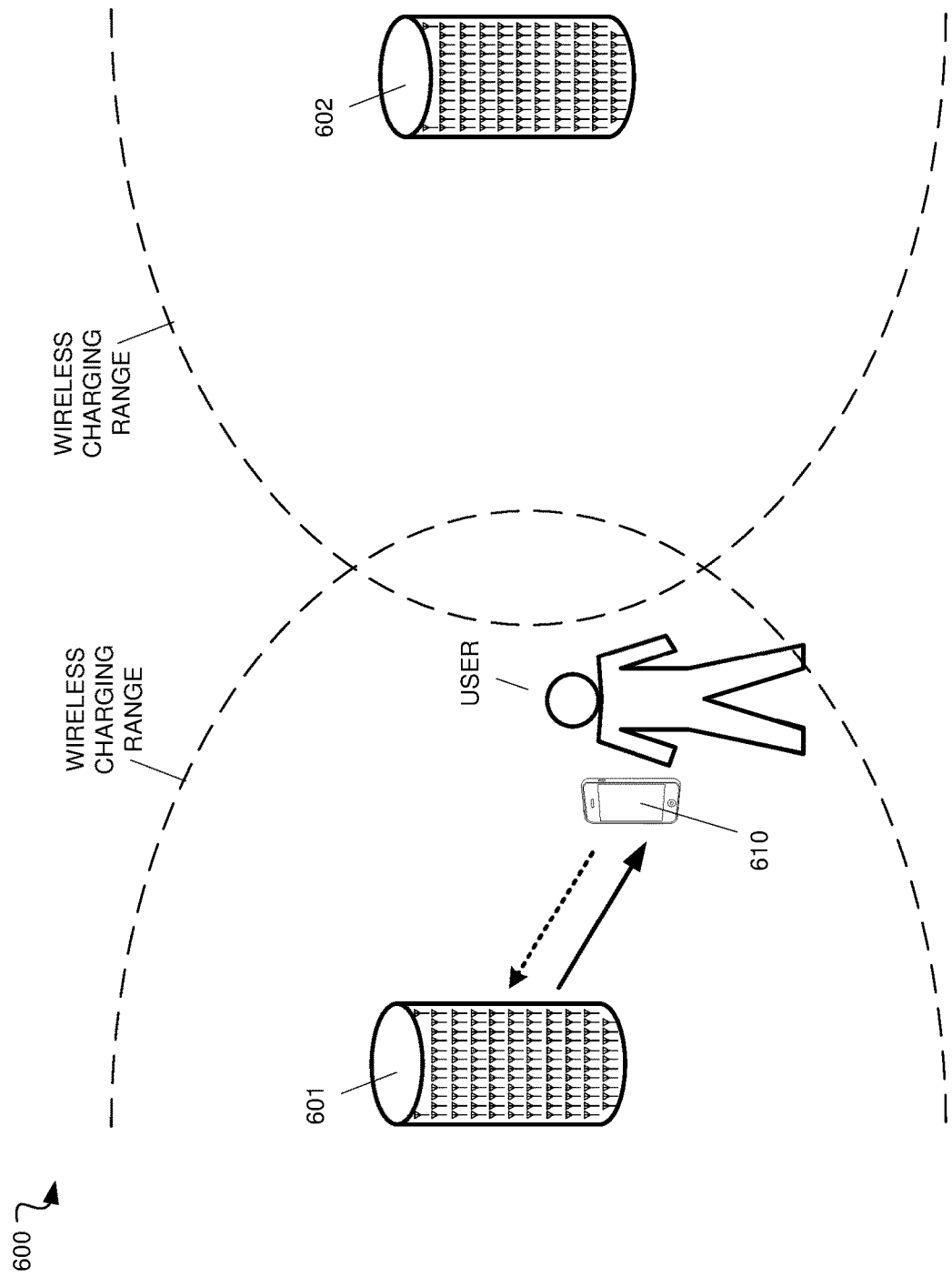
FIGS. 6A and 6B depict diagrams illustrating an example roaming wireless power delivery environment for anytime beaconing in accordance with some embodiments.
Figure 6B:
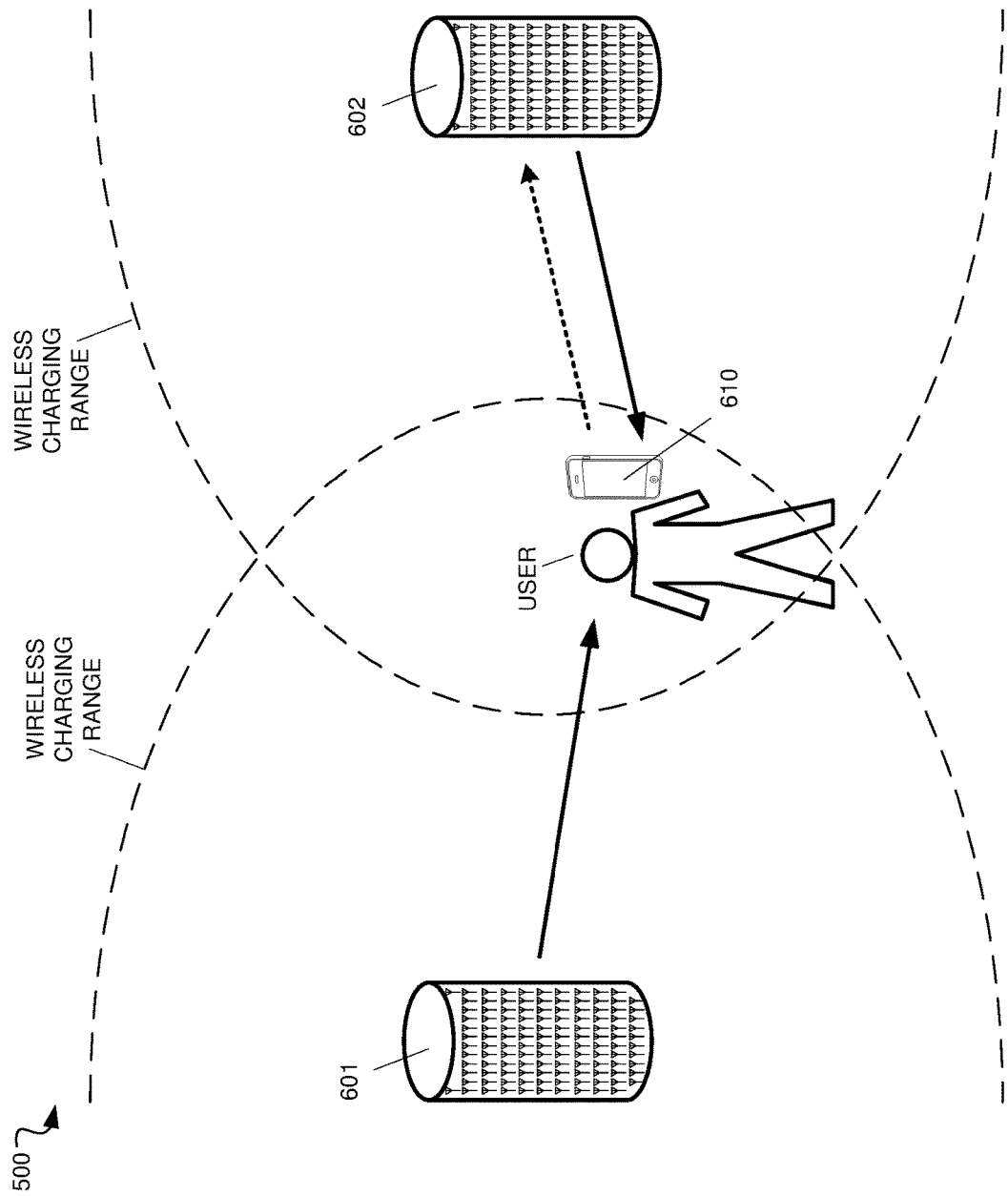

FIGS. 6A and 6B depict diagrams illustrating example roaming wireless power delivery environment 600 for anytime beaconing in accordance with some embodiments. Referring to FIG. 6A, roaming wireless power delivery environment 600 includes wireless power transmission systems 601-602 and wireless power charging ranges, as indicated by the dashed-lined semi-circles radiating out of each of wireless power transmission system 601-602. Roaming wireless power delivery environment 600 also includes a user operating wireless power receiver client 610. It should be noted that wireless power receiver client 610 transmits an encoded beacon signal to wireless power transmission system 601, as indicated by the dotted-lined arrow. In return, wireless power receiver client 610 receives a wireless power signal from wireless power transmission system 601, as indicated by the solid-lined arrow.

Referring next to FIG. 6B, the user has now roamed into the wireless power charging range associated with wireless power transmission system 101. In this particular example, wireless power receiving client 610 is still receiving wireless power from wireless power transmission system 601. However, upon entering the wireless power charging range of wireless power transmission system 602, wireless power receiver client 610 initiates an additional encoded beacon signal, this time to wireless power transmission system 602. Wireless power receiver client then receives power from both wireless power transmission systems 601-602.

Advantageously, wireless power receiver client 610 may initiate wireless power transmission whenever wireless power receiver client 610 determines that it is within range of a wireless power transmission system 601. Therefore, wireless power receiver client 610 does not need to continuously listen for instructions on when to receive wireless power transmissions from a wireless power transmission system. In contrast, wireless power receiver client 610 can sleep and wake up when it determines that it is within range of a wireless power transmission system. This can save power for wireless power receiver device 610 and operate using a passive power harvesting mode instead of an active power harvesting mode. Additionally, wireless power receiver client 610 can receive power from any wireless power transmission system and not from a specific wireless power transmission system since wireless power receiver client 610 is registered with the roaming wireless power delivery environment and not with any particular wireless power transmission system.

Figure 7:
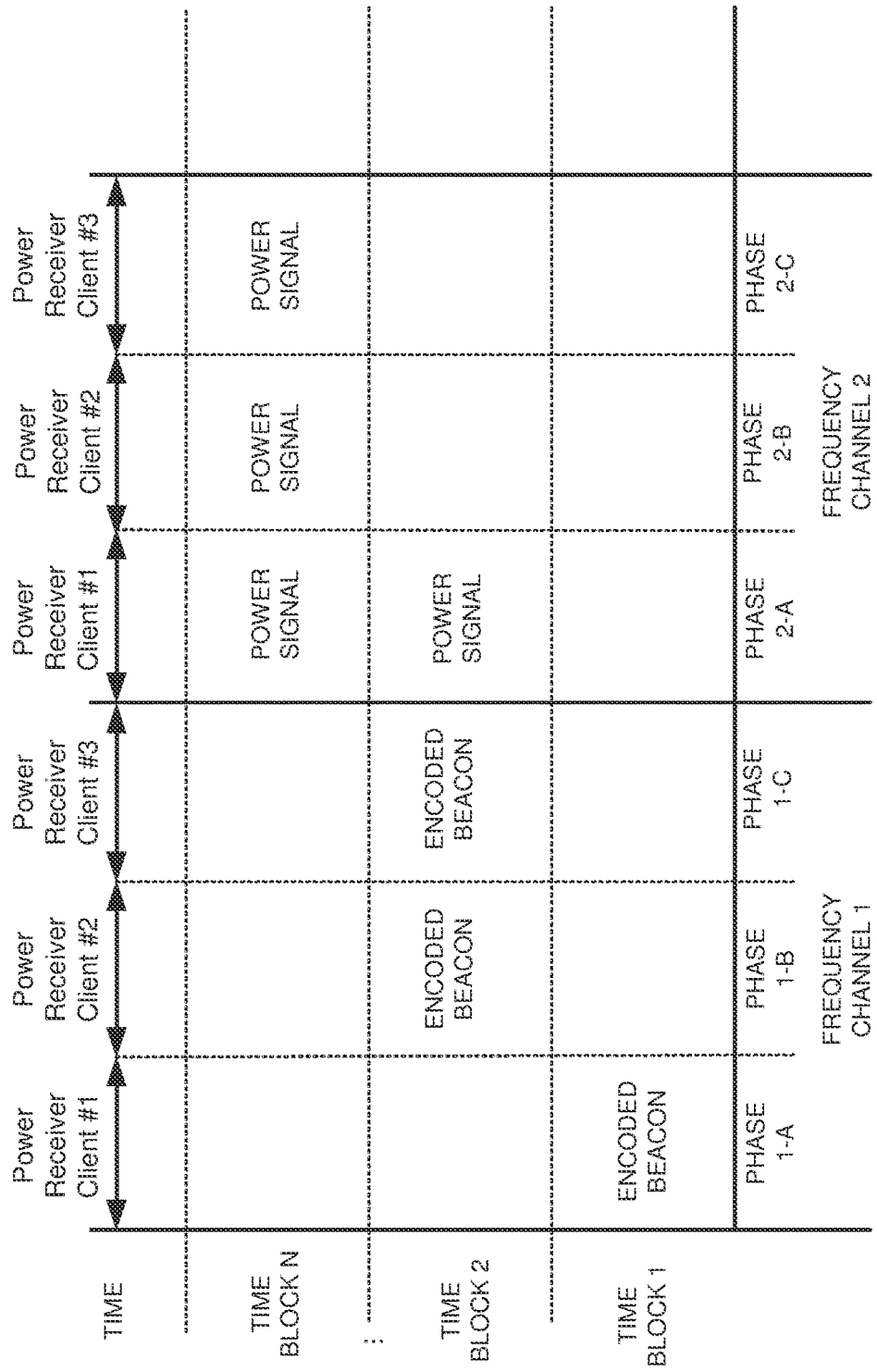
FIG. 7 is a timing diagram illustrating an example full-duplex timing schedule for anytime beaconing in accordance with some embodiments.

FIG. 7 is a timing diagram illustrating an example full-duplex timing schedule for anytime beaconing in accordance with some embodiments. As shown on the timing diagram, wireless power receiver clients may transmit encoded beacon signals over a first frequency channel and receive wireless power on a second frequency channel. Each frequency channel includes multiple phases to enable full-duplexing in receiving encoded beacon signals and transmitting wireless power. Additionally, the full-duplex timing schedule for anytime beaconing includes time block one through time block N.

In operation, the wireless power transmission system receives a first encoded beacon signal from a first power receiver client in the first time block. As illustrated on the full-duplex timing schedule, the encoded beacon signal from the first wireless power receiver client is received over the first frequency channel and in a first phase, such as phase 1-A. Although not shown, wireless power transmission system then processes the encoded beacon signal received from the first wireless power receiver client to identify client-specific information associated with the first wireless power receiver client. In this example, the wireless power transmission system may process the received phase of the encoded beacon (such as phase 1-A on frequency channel one) received from the first wireless power receiver client and identify the client-specific information associated with the first wireless power receiver client based on a stored phase corresponding to the received phase on the encoded beacon (such as phase 2-A on frequency channel two). Wireless power transmission system may then generate a transmission configuration for the first wireless power receiver client based on the client-specific information.

In the next time block, the wireless power transmission system directs the antenna array to deliver wireless power to the first wireless power receiver client on the second frequency and phase 2-B during time block two. Also during time block two, wireless power transmission system simultaneously receives another encoded beacon signal delivered from and initiated by the second wireless power receiver client over phase 1-C and the third wireless power receiver client over phase 1-C on the first frequency channel. During time block N, wireless power transmission system transmits wireless power to each of the wireless power receiver clients over phases A-C on the second frequency channel. Advantageously, the wireless power transmission system can both receive encoded beacon signals and transmit wireless power signals to multiple clients during a single time block. This results in optimal charging efficiency and a reduction on time spent communication and coordinating power transmission schedules between wireless power receiver clients.

Figure 8:
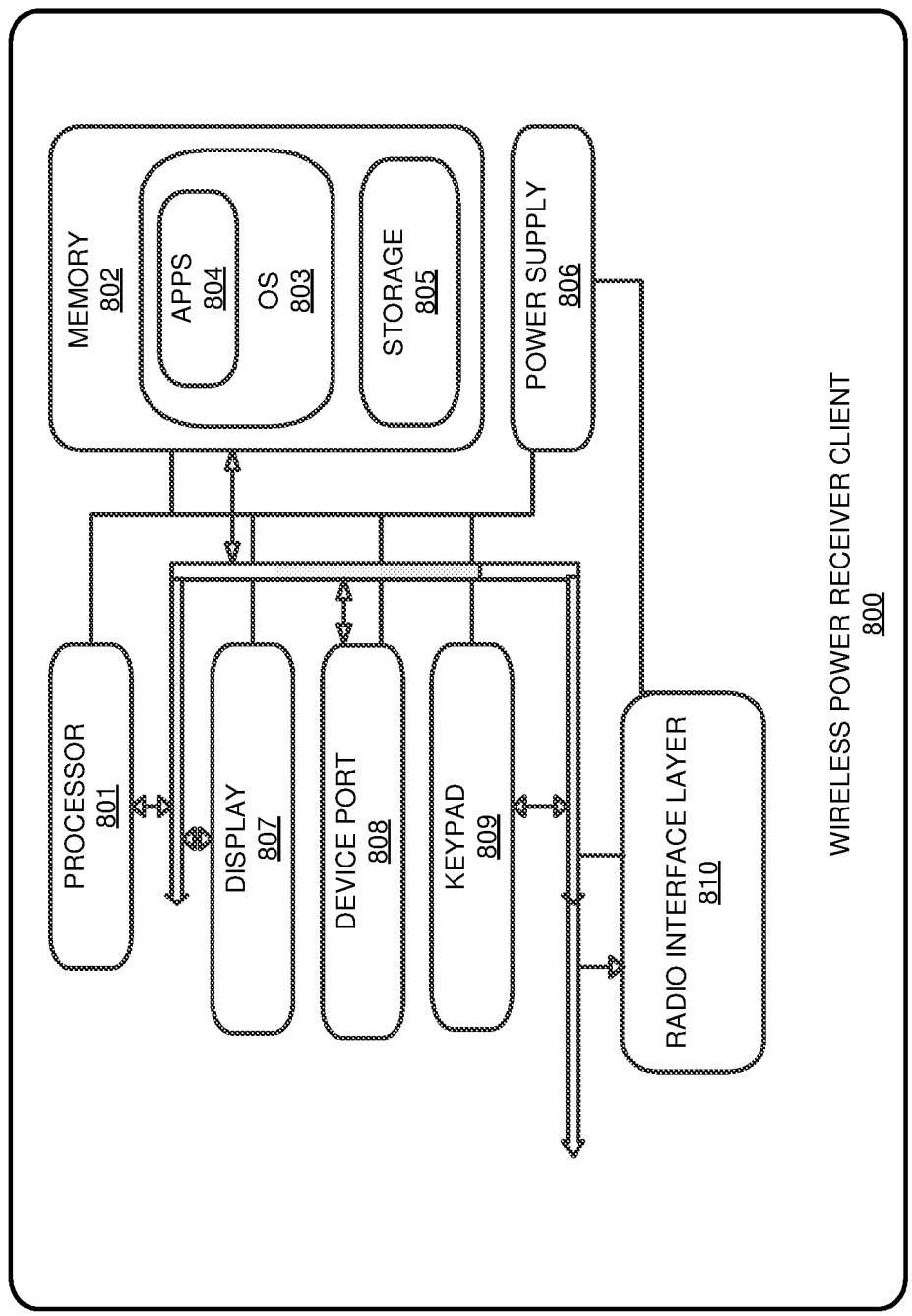
FIG. 8 depicts a block diagram illustrating example components of a representative mobile device or tablet computer with one or more wireless power receiver clients in the form of a mobile (or smart) phone or tablet computer device in accordance with some embodiments.

FIG. 8 depicts a block diagram illustrating example components of a representative mobile device or tablet computer with one or more wireless power receiver clients in the form of a mobile (or smart) phone or tablet computer device in accordance with some embodiments. That is, the wireless power receiver client 800 can incorporate a system (i.e., an architecture) 802 to implement some examples. In one examples, the system is implemented as a "smart phone" capable of receiving wireless power transmissions from wireless power transmission systems. In some examples, the system is integrated as a computing device, such as an integrated personal digital assistant (PDA), tablet and wireless phone.

One or more application programs 804 may be loaded into the memory 802 and run on or in association with the operating system 803. Examples of the application programs include phone dialer programs, e-mail programs, personal information management (PIM) programs, word processing programs, spreadsheet programs, Internet browser programs, messaging programs, and so forth. The system also includes a non-volatile storage area 805 within the memory 802. The non-volatile storage area 805 may be used to store persistent information that should not be lost if the system is powered down. The application programs 804 may use and store information in the non-volatile storage area 805, such as e-mail or other messages used by an e-mail application, and the like. A synchronization application (not shown) also resides on the system and is programmed to interact with a corresponding synchronization application resident on a host computer to keep the information stored in the non-volatile storage area 805 synchronized with corresponding information stored at the host computer. As should be appreciated, other applications may be loaded into the memory 802 and run on the mobile computing device described herein.

The system has a power supply 806, which may be implemented as one or more batteries. The power supply 806 might further include an external power source, such as an AC adapter or a powered docking cradle that supplements or recharges the batteries. The wireless power receiver client 800 typically includes a display 807 and keypad 809 that allow the user to enter information into the wireless power receiver client 800. The display 807 of the wireless power receiver client 800 may also function as an input device (e.g., touch screen display). In alternative examples, wireless power receiver client 800 may incorporate more or less input elements. For example, the display 807 may not be a touch screen in some examples. In yet another alternative example, the wireless power receiver client 800 is a portable phone system, such as a cellular phone. Optional keypad 809 may be a physical keypad or a "soft" keypad generated on the touch screen display or any other soft input panel (SIP).

In various examples, the output elements include the display 807 for showing a GUI. In some examples, the wireless power receiver client 800 incorporates a vibration transducer for providing the user with tactile feedback. In yet another example, the wireless power receiver client 800 incorporates input and/or output ports, such as an audio input (e.g., a microphone jack), an audio output (e.g., a headphone jack), and a video output (e.g., a HDMI port) for sending signals to or receiving signals from an external device.

The system may include device port 808 that performs the function of facilitating connectivity between system and one or more peripheral devices. Transmissions to and from the device port 808 are conducted under control of the operating system 803. In other words, communications received by the device port 808 may be disseminated to the application programs 804 via the operating system 803, and vice versa. The system also includes a radio interface layer 810 that performs the function of transmitting and receiving encoded beacon signals. The radio interface layer 810 facilitates wireless connectivity between the system and the "outside world," to initiate a wireless power transmission. Transmissions to and from the radio interface layer 810 are conducted under control of the operating system 803. In other words, communications received by the radio interface layer 810 may be disseminated to the application programs 804 via the operating system 803, and vice versa.

A mobile wireless power receiver client 800 implementing the system may have additional features or functionality. For example, the mobile wireless power receiver client 800 may also include additional data storage devices (removable and/or non-removable) such as, magnetic disks, optical disks, or tape. Such additional storage is illustrated in FIG. 8 by the non-volatile storage area 805. Data/information generated or captured by the mobile wireless power receiver client 800 and stored via the system may be stored locally on the mobile wireless power receiver client 800, as described above, or the data may be stored on any number of storage media that may be accessed by the device via the radio interface layer 810 or via a wired connection between the mobile wireless power receiver client 800 and a separate computing device associated with the mobile wireless power receiver client 800, for example, a server computer in a distributed computing network, such as the Internet. As should be appreciated such data/information may be accessed via the mobile wireless power receiver client 800 via the radio interface layer 810 or via a distributed computing network. Similarly, such data/information may be readily transferred between computing devices for storage and use according to well-known data/information transfer and storage means, including electronic mail and collaborative data/information sharing systems.

Figure 9:
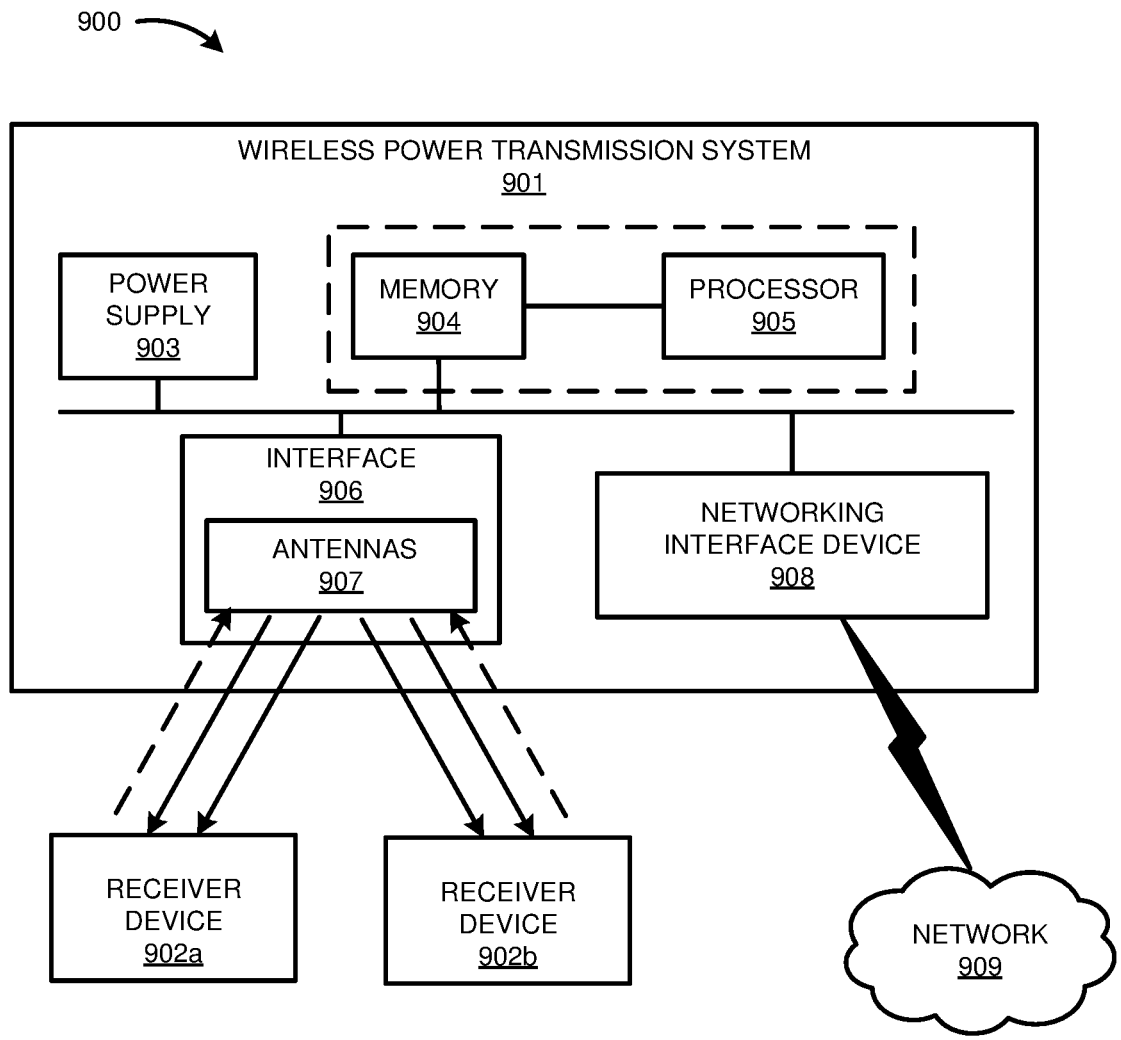
FIG. 9 depicts a diagrammatic representation of a machine, in the example form, of a computer system within which a set of instructions, for causing the machine to perform any one or more of the methodologies discussed herein, may be executed.

FIG. 9 is a diagram illustrating an example wireless communication signal delivery environment for anytime beaconing in accordance with an embodiment. The wireless signal delivery environment 900 includes wireless power transmission system 901, a user operating receiver devices 902a-902b, and wireless network 909. wireless power transmission system 601 can be wireless power transmission system 101 depicted in FIG. 1 or wireless power transmission system 400 of FIG. 4, although alternative configurations are possible. Likewise, receiver devices 902a-902b can be wireless power receiver clients 110-112 of FIG. 1, respectively, although alternative configurations are possible.

Wireless power transmission system 901 includes power supply 903, memory 904, processor 905, interface 906, and one or more antennas (or transceivers) 907 that have a radiation and reception pattern directed in a space proximate to receiver device 902. wireless power transmission system 901 transmits a wireless communication signal over multiple antennas 907 to receiver devices 902a-902b. As discussed herein, wireless power transmission system 901 transmits the wireless communication signal at an angle in the direction of receiver devices 902a-902b such that the strength of the received communication signal by receiver devices 902a-902b depends on the accuracy of the directivity of the beams from antennas 907.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetics. As shown in the example of FIG. 9, the radiation pattern can be any number of shapes and strengths depending on the directivity of the beam created by the waveform characteristics and the types of antennas (e.g., horn antennas, simple vertical antenna, etc.) used in the antenna design of antennas 907. For example, the radiation pattern can comprise various directive patterns and any number of different antenna radiation patterns is possible in a wireless communication delivery environment. By way of example and not limitation, the wireless power transmit characteristics can include phase settings for each antenna or transceiver, transmission power settings, etc.

As discussed herein, the wireless power transmission system 901 determines the wireless communication transmit characteristics such that, once the antennas or transceivers are configured, the multiple antennas or transceivers are operable to transmit a wireless power signal that matches the client radiation pattern in the space proximate to the client device. Advantageously, as discussed herein, the wireless communication signal may be adjusted to more accurately direct the beam of the wireless communication signal toward receiver devices 902a-902b.

The directivity of the radiation pattern shown in the example of FIG. 9 is illustrated for simplicity, it is appreciated that any number of paths can be utilized for transmitting the wireless communication signal to receiver devices 902a-902b depending on, among other factors, reflective and absorptive objects in the wireless communication delivery environment.

The positioning and repositioning of receiver devices 902a-902b in the wireless communication delivery environment may be tracked by wireless power transmission system 901 using a three-dimensional angle of incidence of an RF signal (at any polarity) paired with a distance determined by using an RF signal strength or any other method. As discussed herein, an array of antennas capable of measuring phase may be used to detect a wave-front angle of incidence. An angle of direction toward receiver devices 902a-902b may be determined based on distance to receiver devices 902a-902b and on power calculations. Alternatively, or additionally, the angle of direction to receiver devices 902a-902b can be determined from multiple array segments.

In some embodiments, the degree of accuracy in determining the angle of direction toward receiver devices 902a-902b depends on the size and number of antennas 907, number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A method of operating a full-duplex wireless power transmission system including an antenna array having at least: a first antenna coupled to a first switch, and a second antenna coupled to a second switch, the method comprising:
   receiving, by the first antenna enabled by the first switch, and while the second antenna is disabled by the second switch, a first encoded beacon signal delivered from, and initiated by, a first wireless power receiver client; and
   responsive to receiving the first encoded beacon signal,
      delivering, via the second antenna enabled by the second switch, wireless power to the first wireless power receiver client; and
      detecting, by the first antenna enabled by the first switch, and while also delivering the wireless power to the first wireless power receiver client via the second antenna, a second encoded beacon signal delivered from, and initiated by, a second wireless power receiver client different from the first wireless power receiver client.

2. The method of claim 1, wherein the first encoded beacon signal indicates a low power level of the first wireless power receiver client.

3. The method of claim 1, wherein the first encoded beacon signal indicates movement of the first wireless power receiver client into a receiving range of the wireless power transmission system.

4. The method of claim 1, further comprising:
   processing the first encoded beacon signal received from the first wireless power receiver client to identify client-specific information associated with the first wireless power receiver client; and
   generating a transmission configuration for the first wireless power receiver client based on the client-specific information.

5. The method of claim 4, wherein processing the first encoded beacon signal received from the first wireless power receiver client to identify the client-specific information associated with the first wireless power receiver client comprises determining a phase at which the first encoded beacon is received from the first wireless power receiver to identify the client-specific information associated with the first wireless power receiver client based on a stored phase corresponding to the phase at which the first encoded beacon signal is received.

6. The method of claim 4, wherein the first antenna is a first plurality of antennas, wherein the second antenna is a second plurality of antennas, wherein generating the transmission configuration for the first wireless power receiver client based on the client-specific information comprises:
   at an antenna of the first plurality of antennas, determining a complex conjugate of the received first encoded beacon signal; and calculating a power transmission phase-shift based on the complex conjugate, and wherein delivering the wireless power to the first wireless power receiver client using the transmission configuration includes directing an antenna of the second plurality of antennas to deliver wireless power to the first wireless power receiver client using the corresponding power transmission phase-shifts.

7. The method of claim 1, wherein the wireless power is delivered to the first wireless power receiver client via a first frequency channel while the second encoded beacon signal is also received from the second wireless power receiver client via a second frequency channel.

8. The method of claim 1, wherein the full-duplex wireless power transmission system is configured to communicate with half-duplex wireless power receiver clients.

9. The method of claim 7, wherein the first and second frequency channels include multiple phases to facilitate full-duplex in receiving encoded beacon signals and transmitting wireless power.

10. A full-duplex wireless power transmission system comprising:

an antenna array including at least:
a first antenna coupled to a first switch configured to alternately enable and disable the first antenna; and
a second antenna coupled to a second switch configured to alternately enable and disable the second antenna; and
control circuitry operatively coupled with the antenna array, the control circuitry configured to:
responsive to receiving, by the first antenna enabled by the first switch, and while the second antenna is disabled by the second switch, a first encoded beacon signal delivered from, and initiated by, a first wireless power receiver client, direct the second antenna enabled by the second switch to deliver wireless power to the first wireless power receiver client; and
detect, by the first antenna enabled by the first switch, and while the wireless power is also being delivered to the first wireless power receiver client via the second antenna, a second encoded beacon signal delivered from, and initiated by, a second wireless power receiver client different from the first wireless power receiver client.

11. The wireless power transmission system of claim 10, wherein the first encoded beacon signal indicates a low power level of the first wireless power receiver client.

12. The wireless power transmission system of claim 10, wherein the first encoded beacon signal indicates a movement of the first wireless power receiver client into a receiving range of the wireless power transmission system.

13. The wireless power transmission system of claim 10, wherein the control circuitry is further configured to:
process the first encoded beacon received from the first wireless power receiver client to identify client-specific information associated with the first wireless power receiver client; and
generate a transmission configuration for the first wireless power receiver client based on the client-specific information.

14. The wireless power transmission system of claim 13, wherein to process the first encoded beacon received from the first wireless power receiver client to identify the client-specific information associated with the first wireless power receiver client, the control circuitry is configured to determine a phase at which the first encoded beacon is received from the first wireless power receiver to identify the client-specific information associated with the first wireless power receiver client based on a stored phase corresponding to the phase at which the first encoded beacon is received.

15. The wireless power transmission system of claim 13, wherein the first antenna is a first plurality of antennas, wherein the second antenna is a second plurality of antennas, wherein to generate the transmission configuration for the first wireless power receiver client based on the client-specific information, the control circuitry is configured to:
at an antenna of the first plurality of antennas,
determine a complex conjugate of the received first encoded beacon signal; and
calculate a power transmission phase-shift based on the complex conjugate, and
wherein to direct the second plurality of antennas to deliver the wireless power to the first wireless power receiver client using the transmission configuration, the control circuitry is further configured to direct an antenna of the second plurality of antennas to deliver wireless power to the first wireless power receiver client using the calculated power transmission phase-shifts.

16. The wireless power transmission system of claim 10, wherein the wireless power is delivered to the first wireless power receiver client via a first frequency channel while the second encoded beacon signal is also received from the additional second wireless power receiver client via a second frequency channel.

17. The wireless power transmission system of claim 10, wherein the full-duplex wireless power transmission system is configured to communicate with half-duplex wireless power receiver clients.

18. The wireless power transmission system of claim 16, wherein the first and second frequency channels include multiple phases to facilitate full-duplex in receiving encoded beacon signals and transmitting wireless power.

19. One or more non-transitory computer-readable storage media having stored thereon program instructions which, when executed by a processor of a full-duplex wireless power transmission system including an antenna array having at least: a first antenna coupled to a first switch, and a second antenna coupled to a second switch, cause the system to:
responsive to receiving, by the first antenna enabled by the first switch, and while the second antenna is disabled by the second switch, a first encoded beacon signal delivered from, and initiated by, a first wireless power receiver client, direct the second antenna enabled by the second switch to deliver wireless power to the first wireless power receiver client; and
detect, by the first antenna enabled by the first switch, and while the wireless power is also being delivered to the first wireless power receiver client via the second antenna, a second encoded beacon signal delivered from, and initiated by, a second wireless power receiver client different from the first wireless power receiver client.

20. The one or more non-transitory computer-readable storage media of claim 19, wherein the wireless power is delivered to the first wireless power receiver client via a first frequency channel while the second encoded beacon signal is also received from the second wireless power receiver client via a second frequency channel.

21. The one or more non-transitory computer-readable storage media of claim 20, wherein the first and second frequency channels include multiple phases to facilitate full-duplex in receiving encoded beacon signals and transmitting wireless power.

* * * * *